United States Patent
Cheng et al.

(10) Patent No.: US 9,445,468 B1
(45) Date of Patent: Sep. 13, 2016

(54) VOLTAGE CONVERTING DEVICE

(71) Applicant: I Shou University, Kaohsiung (TW)

(72) Inventors: Chun-An Cheng, Kaohsiung (TW); Tsung-Yuan Chung, Kaohsiung (TW)

(73) Assignee: I SHOU UNIVERSITY, Kaohsiung (TW)

( * ) Notice: Subject to any disclaimer, the term of this patent is extended or adjusted under 35 U.S.C. 154(b) by 0 days.

(21) Appl. No.: 14/861,967

(22) Filed: Sep. 22, 2015

(51) Int. Cl.
*H05B 33/08* (2006.01)
*H02M 3/335* (2006.01)

(52) U.S. Cl.
CPC ..... *H05B 33/0815* (2013.01); *H02M 3/33507* (2013.01)

(58) Field of Classification Search
CPC .................. H05B 33/0815; H02M 3/33507
See application file for complete search history.

(56) References Cited

U.S. PATENT DOCUMENTS

| | | | | |
|---|---|---|---|---|
| 6,088,242 A | * | 7/2000 | Koegel | H02M 1/4258 363/131 |
| 2004/0252529 A1 | * | 12/2004 | Huber | H02M 1/4258 363/21.12 |
| 2007/0263417 A1 | * | 11/2007 | Lin | H02M 1/34 363/21.12 |
| 2011/0317450 A1 | * | 12/2011 | Cheng | H02M 1/4241 363/20 |
| 2014/0092643 A1 | * | 4/2014 | Luccato | H02M 3/335 363/21.12 |

* cited by examiner

*Primary Examiner* — Jany Richardson
(74) *Attorney, Agent, or Firm* — DLA Piper LLP (US)

(57) ABSTRACT

A voltage converting device includes an input circuit to rectify an AC input voltage, a voltage converter receiving the rectified input voltage, a specific connection of a switch, an inductor, a capacitor and two discharging diodes coupled between the input circuit and a primary-side winding of the voltage converter, and an output circuit coupled to a secondary-side winding of the voltage converter to output a DC output voltage. Through proper operation of the switch, the AC input voltage may be converted into the DC output voltage.

11 Claims, 6 Drawing Sheets

VOLTAGE CONVERTING DEVICE

FIELD

The disclosure relates to a voltage converting device, and more particularly to a voltage converting device adapted for converting an AC input voltage into a DC output voltage for use by a light emitting diode (LED) unit.

BACKGROUND

Referring to FIG. 1, a conventional voltage converting device for a light emitting device (e.g., an LED device) includes a frontend boost-type AC-DC converter 4 with power factor correction, and a backend half-bridge LLC resonant DC-DC converter 5. Since each of the frontend stage and the backend stage of such a conventional voltage converting device requires a dedicated controller, the entire voltage converting device may include at least three power switches, which results in relatively high circuit complexity due to the number of circuit components, resulting in high costs.

SUMMARY

Therefore, an object of the disclosure is to provide a voltage converting device that may have a relatively simple circuit structure and low costs.

According to the disclosure, the voltage converting device includes an input circuit, a voltage converter, a switch, an inductor, a capacitor, a first discharging diode, a second discharging diode, and an output circuit.

The input circuit is configured to receive and rectify an alternating current (AC) input voltage, and to generate a rectified voltage. The voltage converter is coupled to the input circuit for receiving the rectified voltage therefrom, and includes a primary-side winding and a secondary-side winding, each of which has a first terminal and a second terminal. The switch has a first terminal coupled to the second terminal of the primary-side winding, and a second terminal. The inductor has a first terminal coupled to the second terminal of the switch, and a second terminal coupled to the input circuit. The capacitor has a first terminal, and a second terminal coupled to the second terminal of the switch. The first discharging diode has an anode coupled to the second terminal of the inductor, and a cathode coupled to the first terminal of the capacitor. The second discharging diode has an anode coupled to the first terminal of the capacitor, and a cathode coupled to the first terminal of the primary-side winding. The output circuit is coupled to the secondary-side winding in parallel, and is configured to generate a direct current (DC) output voltage.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
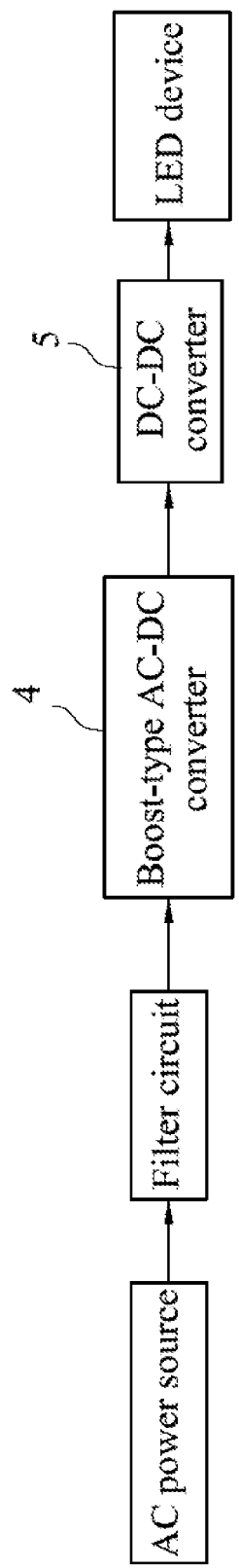
FIG. 1 is a block diagram illustrating a conventional voltage converting device for an LED device.

Before the disclosure is described in greater detail, it should be noted that like elements are denoted by the same reference numerals throughout the disclosure.

Figure 2:
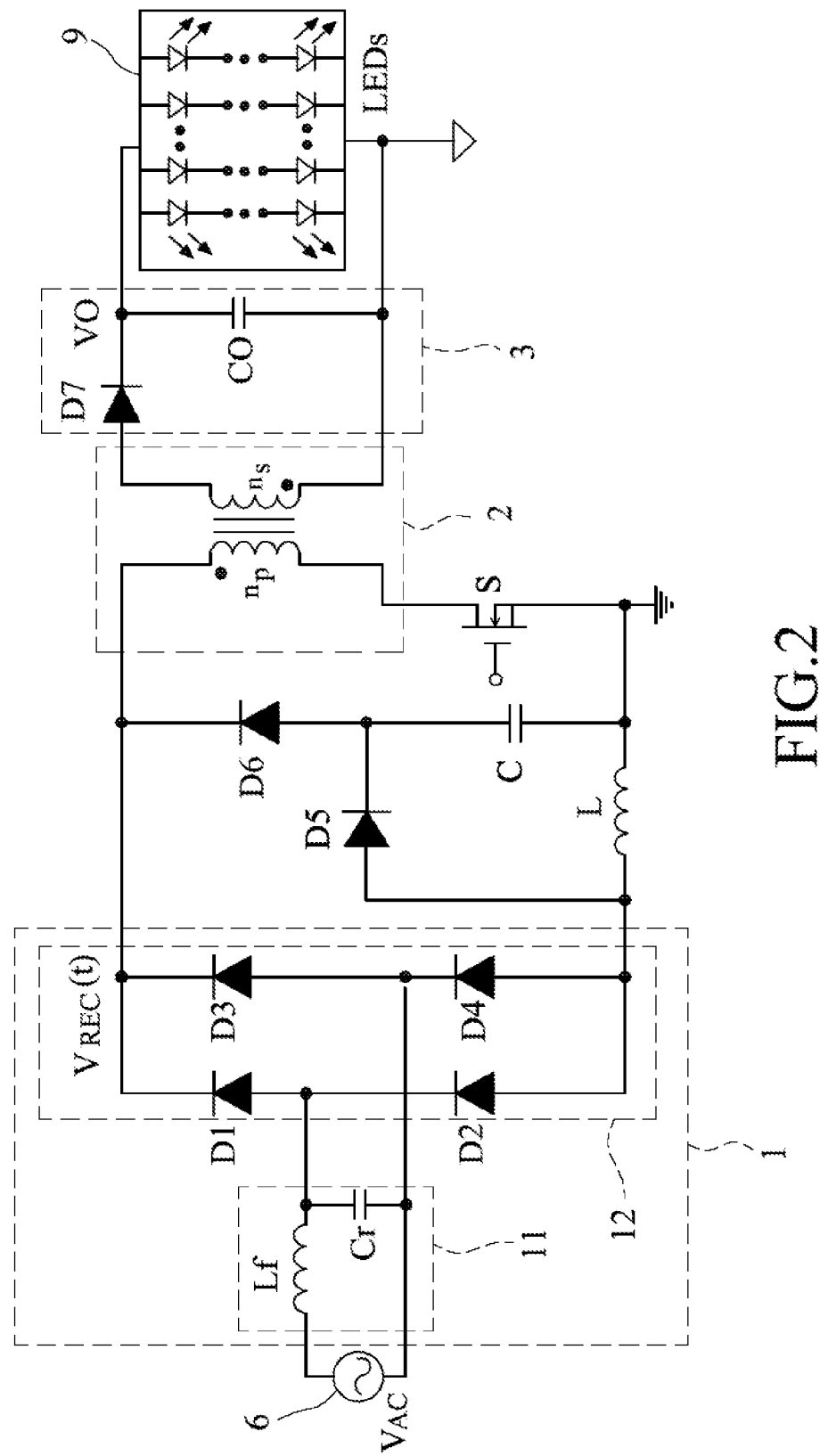
FIG. 2 is a schematic circuit diagram illustrating an embodiment of the voltage converting device according to this disclosure.

Referring to FIG. 2, the embodiment of the voltage converting device according to this disclosure is adapted for converting an AC (alternating current) input voltage ($V_{AC}$) into a DC (direct current) output voltage (VO) for use by an LED (light emitting diode) unit 9, and includes an input circuit 1, a voltage converter 2, a switch (S), an inductor (L), a capacitor (C), a first discharging diode (D5), a second discharging diode (D6) and an output circuit 3.

The input circuit 1 is coupled to an AC power source 6 for receiving the input voltage ($V_{AC}$), filters out noises from and rectifies the input voltage ($V_{AC}$), and generates a rectified voltage ($V_{REC}(t)$). In detail, the input circuit 1 includes a filter circuit 11 and a rectifier circuit 12. The filter circuit 11 is coupled to the power source 6 for receiving the input voltage ($V_{AC}$), and filters out the noises from the input voltage ($V_{AC}$) to obtain a filtered voltage (not shown). The rectifier circuit 12 is coupled to the filter circuit 11 for receiving the filtered voltage therefrom, and rectifies the filtered voltage to obtain the pulsating DC rectified voltage ($V_{REC}(t)$).

In this embodiment, the filter circuit 11 includes: a resonant inductor (Lf) having a first terminal coupled to the power source 6, and a second terminal; and a resonant capacitor (Cr) having a first terminal coupled to the second terminal of the resonant inductor (Lf), and a second terminal. The rectifier circuit 12 includes: a first rectifying diode (D1) having an anode coupled to the first terminal of the resonant capacitor (Cr), and a cathode; a second rectifying diode (D2) having a cathode coupled to the anode of the first rectifying diode (D1), and an anode; a third rectifying diode (D3) having a cathode coupled to the cathode of the first rectifying diode (D1), and an anode coupled to the second terminal of the resonant capacitor (Cr); and a fourth rectifying diode (D4) having a cathode coupled to the second terminal of the resonant capacitor (Cr), and an anode coupled to the anode of the second rectifying diode (D2).

The voltage converter 2 is coupled to the input circuit 1 for receiving the rectified voltage ($V_{REC}(t)$), and includes a primary-side winding ($n_p$) and a secondary-side winding ($n_s$), each of which has a polarity first terminal, and a non-polarity second terminal.

The switch (S) has a first terminal coupled to the second terminal of the primary-side winding ($n_p$), a second terminal, and a control terminal for controlling electrical connection between the first and second terminals thereof. In this embodiment, the switch (S) is an N-type power MOSFET having a drain terminal, a source terminal and a gate terminal to respectively act as the first, second and control terminals of the switch (S).

The inductor (L) has a first terminal coupled to the second terminal of the switch (S), and a second terminal coupled to anode of the fourth rectifying diode (D4) of the input circuit 1.

The capacitor (C) has a first terminal, and a second terminal coupled to the second terminal of the switch (S).

The first discharging diode (D5) has an anode coupled to the second terminal of the inductor (L), and a cathode coupled to the first terminal of the capacitor (C).

The second discharging diode (D6) has an anode coupled to the first terminal of the capacitor (C), and a cathode coupled to the first terminal of the primary-side winding ($n_p$).

The output circuit 3 is coupled to the secondary-side winding ($n_s$) in parallel, and generates the DC output voltage (VO) to drive the LED unit 9. In this embodiment, the output circuit 3 includes: an output diode (D7) having an anode coupled to the second terminal of the secondary-side winding ($n_s$), and a cathode; and an output capacitor (CO) having a first terminal coupled to the cathode of the output diode (D7), and a second terminal coupled to the first terminal of the secondary-side winding ($n_s$). The DC output voltage (VO) is provided at the first terminal of the output capacitor (CO).

Figure 3:
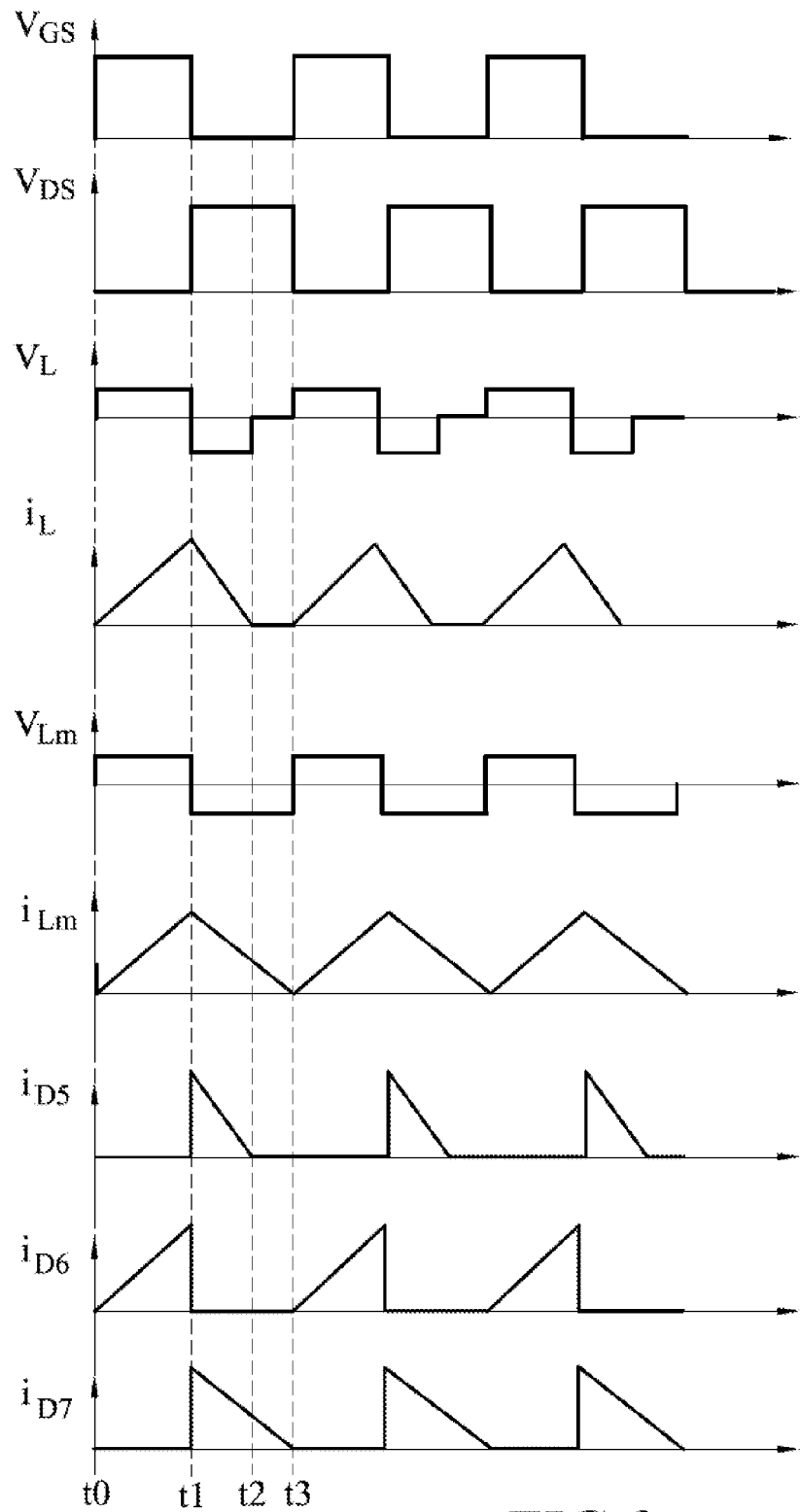
FIG. 3 is a waveform diagram illustrating operations of the embodiment.
Figure 4:
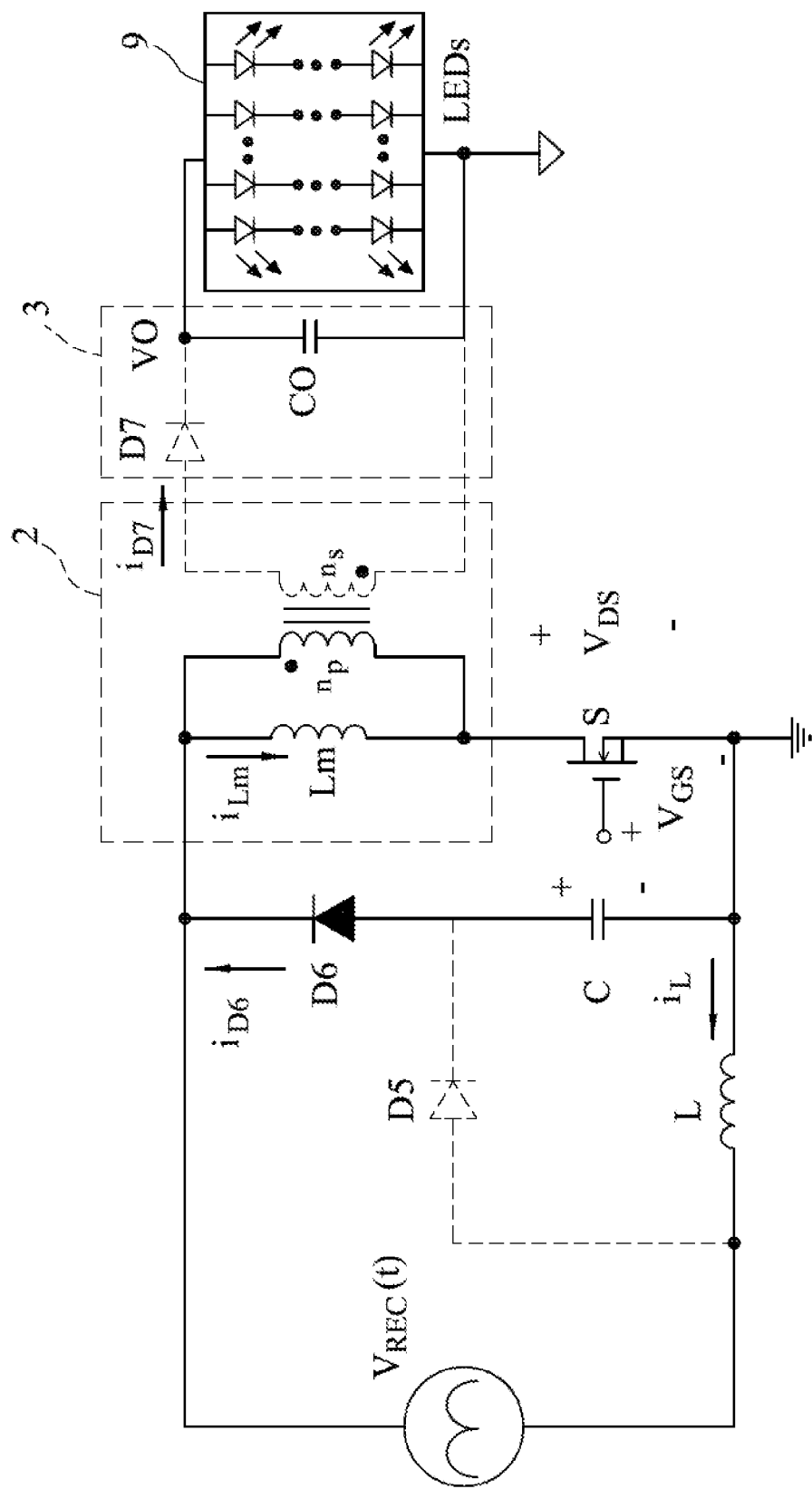
FIG. 4 is a schematic circuit diagram illustrating operation of the embodiment in a first duration.
Figure 5:
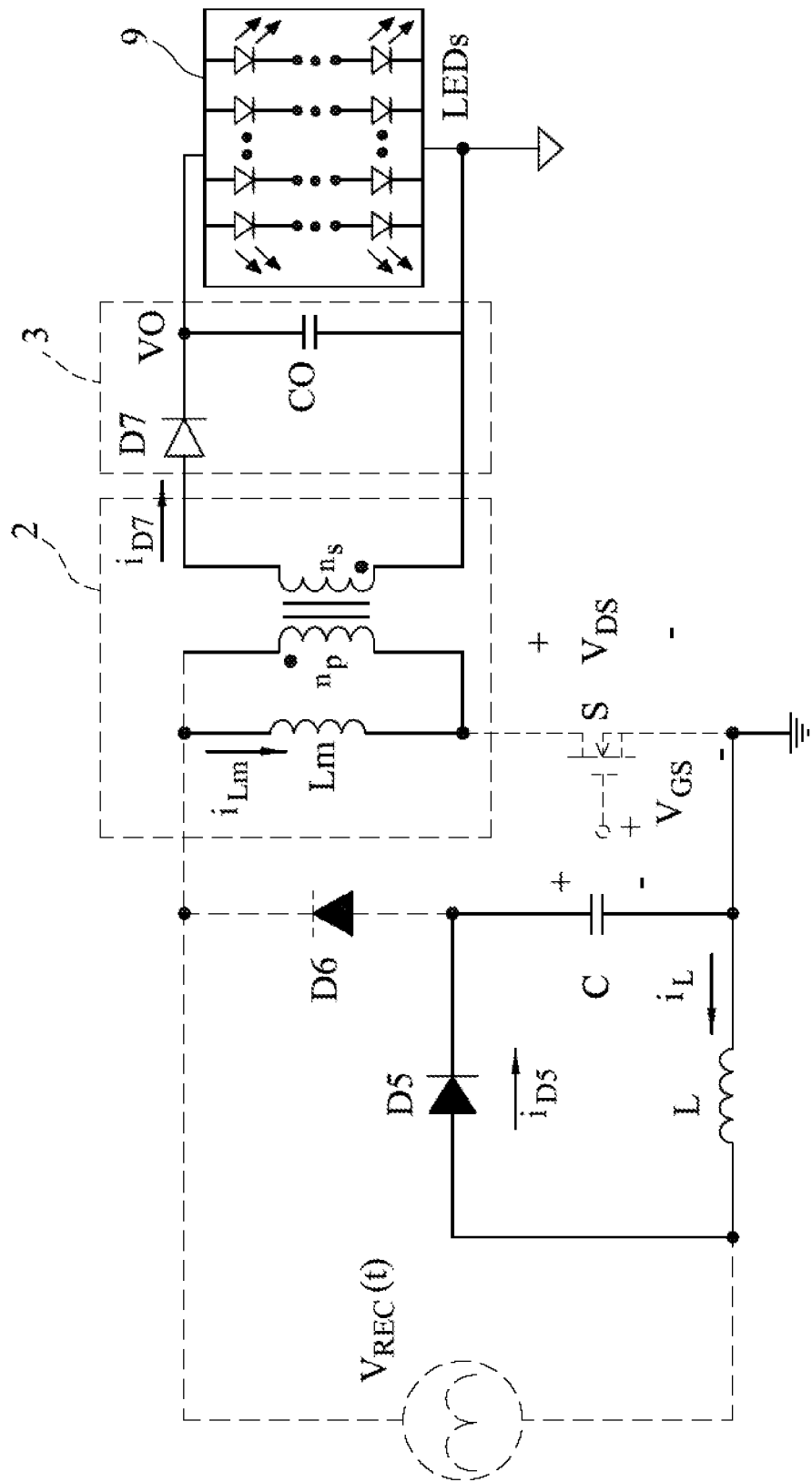
FIG. 5 is a schematic circuit diagram illustrating operation of the embodiment in a second duration.
Figure 6:
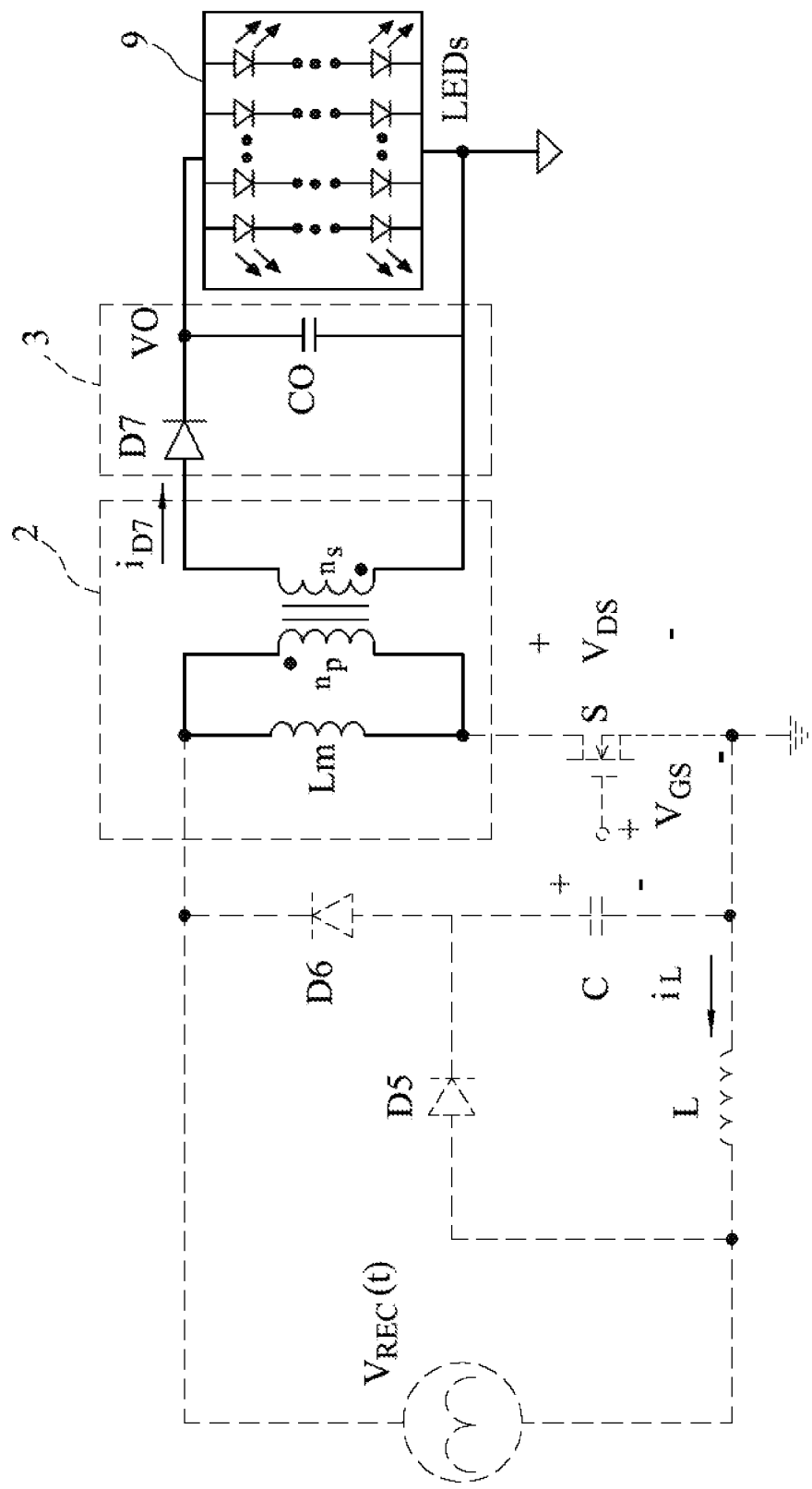
FIG. 6 is a schematic circuit diagram illustrating operation of the embodiment in a third duration.

Referring to FIG. 3, $V_{GS}$ represents a voltage between the control terminal and the second terminal of the switch (S), $V_{DS}$ represents a voltage between the first terminal and the second terminal of the switch (S), $V_L$ and $V_{Lm}$ respectively represent voltages across the inductor (L) and the primary-side winding ($n_p$) that has a magnetizing inductance denoted as a magnetizing inductor (Lm) in FIGS. 4 to 6, $i_L$ and $i_{Lm}$ respectively represent currents flowing through the inductor (L) and the magnetizing inductor (Lm), and $i_{D5}$, $i_{D6}$ and $i_{D7}$ respectively represent currents flowing through the first discharging diode (D5), the second discharging diode (D6) and the output diode (D7). According to switching of the switch (S), operations of this embodiment to drive the LED unit 5 may be divided into three durations. In FIGS. 4-6, solid lines are used to denote the components that conduct, and dotted lines are used to denote the components that are not conducting. It is noted that, in the following descriptions of the operations, it is assumed that energy has been stored in the output capacitor (CO) and the capacitor (C) during previous operation cycles.

Referring to FIGS. 3 and 4, in a first duration between t0 to t1, $V_{GS}$ is at a high voltage level and the switch (S) conducts, while the first discharging diode (D5) does not conduct, so that the capacitor (C) provides the current ($i_{D6}$) to charge the magnetizing inductor (Lm) via the second discharging diode (D6), and a current that is associated with the rectified voltage ($V_{REC}(t)$) flows through the switch (S) to charge the magnetizing inductor (Lm) and the inductor (L). Accordingly, $i_{Lm}$ and $i_L$ linearly increase. At this time, a voltage across the secondary-side winding ($n_s$) is not sufficiently high to cause conduction of the output diode (D7), and the output capacitor (CO) provides the output voltage (VO) to drive the LED unit 9.

Referring to FIGS. 3 and 5, in a second duration between t1 to t2, $V_{GS}$ is at a low voltage level and the switch (S) does not conduct, and the second discharging diode (D6) does not conduct either. The inductor (L) provides a current ($i_{D6}$) flowing through the first discharging diode (D5) to charge the capacitor (C). At this time, the magnetizing inductor (Lm) causes generation of the current ($i_{D7}$) flowing to the output capacitor (CO) and the LED unit 9.

Referring to FIGS. 3 and 6, in a third duration between t2 to t3, $V_{GS}$ is still at the low voltage level and the switch (S) continues to not conduct, such that the second discharging diode (D6) does not conduct. In this duration, a voltage difference across the capacitor (C) and the inductor (L) is not sufficiently large to cause conduction of the first discharging diode (D5), such that the first discharging diode (D5) transitions to become non-conducting. At this time, since the voltage across the magnetizing inductor (Lm) and the output capacitor (CO) is still sufficiently high to cause conduction of the output diode (D7), the magnetizing inductor (Lm) remains to cause generation of the current ($i_{D7}$) flowing to the output capacitor (CO) and the LED unit 9, such that the LED unit 9 continues to emit light and the output capacitor (CO) continues to be charged. Then, a cycle of operations in this embodiment completes, and another cycle begins with the first duration.

In summary, via simple operation of the switch (S), the embodiment of this disclosure has the effect similar to that of the conventional AC-DC converter while maintaining a relatively low cost and also having the function of power factor correction (PFC). With the magnetizing inductor (Lm) being designed to operate in a boundary conduction mode, the function of power factor correction is achievable in cooperation with, e.g., a commercially available PFC control IC.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A voltage converting device comprising:
an input circuit configured to receive and rectify an alternating current (AC) input voltage, and to generate a rectified voltage;
a voltage converter coupled to said input circuit for receiving the rectified voltage therefrom, and including a primary-side winding and a secondary-side winding, each of which has a first terminal and a second terminal;
a switch having a first terminal coupled to said second terminal of said primary-side winding, and a second terminal;
an inductor having a first terminal coupled to said second terminal of said switch, and a second terminal coupled to said input circuit;
a capacitor having a first terminal, and a second terminal coupled to said second terminal of said switch;
a first discharging diode having an anode coupled to said second terminal of said inductor, and a cathode coupled to said first terminal of said capacitor;
a second discharging diode having an anode coupled to said first terminal of said capacitor, and a cathode coupled to said first terminal of said primary-side winding; and
an output circuit coupled to said secondary-side winding in parallel, and configured to generate a direct current (DC) output voltage.

2. The voltage converting device according to claim 1, wherein said input circuit includes:
a filter circuit configured to receive and filter the AC input voltage, and to generate a filtered voltage; and
a rectifier circuit coupled to said filter circuit for receiving the filtered voltage therefrom, and configured to rectify the filtered voltage so as to generate the rectified voltage.

3. The voltage converting device according to claim 2, wherein said filter circuit includes:
a resonant inductor having a first terminal disposed to receiving the AC input voltage, and a second terminal;

a resonant capacitor having a first terminal coupled to said second terminal of said resonant inductor, and a second terminal.

4. The voltage converting device according to claim 3, wherein said rectifier circuit includes:
   a first rectifying diode having an anode coupled to said first terminal of said resonant capacitor, and a cathode;
   a second rectifying diode having a cathode coupled to said anode of said first rectifying diode, and an anode;
   a third rectifying diode having a cathode coupled to said cathode of said first rectifying diode, and an anode coupled to said second terminal of said resonant capacitor; and
   a fourth rectifying diode having a cathode coupled to said second terminal of said resonant capacitor, and an anode coupled to said anode of said second rectifying diode.

5. The voltage converting device according to claim 4, wherein said output circuit includes:
   an output diode having an anode coupled to said second terminal of said secondary-side winding, and a cathode; and
   an output capacitor having a first terminal coupled to said cathode of said output diode, and a second terminal coupled to said first terminal of said secondary-side winding;
   wherein the DC output voltage is provided at said first terminal of said output capacitor.

6. The voltage converting device according to claim 5, wherein, when said switch conducts, a current that is associated with the rectified voltage charges said voltage converter and said inductor via said switch, and said capacitor charges said voltage converter via said second discharging diode.

7. The voltage converting device according to claim 6, wherein, when said switch does not conduct and a voltage across said capacitor and said inductor enables said first discharging diode to conduct, said inductor provides a current that charges said capacitor via said first discharging diode, and said voltage converter provides a current that flows to said output capacitor via said output diode.

8. The voltage converting device according to claim 7, wherein, when said switch does not conduct and the voltage across said capacitor and said inductor does not enable said first discharging diode to conduct, said voltage converter provides a current that flows to said output capacitor via said output diode.

9. The voltage converting device according to claim 1, wherein, for each of said primary-side winding and said secondary-side winding, said first and second terminals thereof are a polarity terminal and a non-polarity terminal, respectively.

10. The voltage converting device according to claim 1, wherein said switch is an N-type power transistor that has a drain terminal and a source terminal respectively acting as said first and second terminals of said switch.

11. The voltage converting device according to claim 1, wherein said output circuit includes:
    an output diode having an anode coupled to said second terminal of said secondary-side winding, and a cathode; and
    an output capacitor having a first terminal coupled to said cathode of said output diode, and a second terminal coupled to said first terminal of said secondary-side winding;
    wherein the DC output voltage is provided at said first terminal of said output capacitor.

* * * * *